Figures 1, 2:
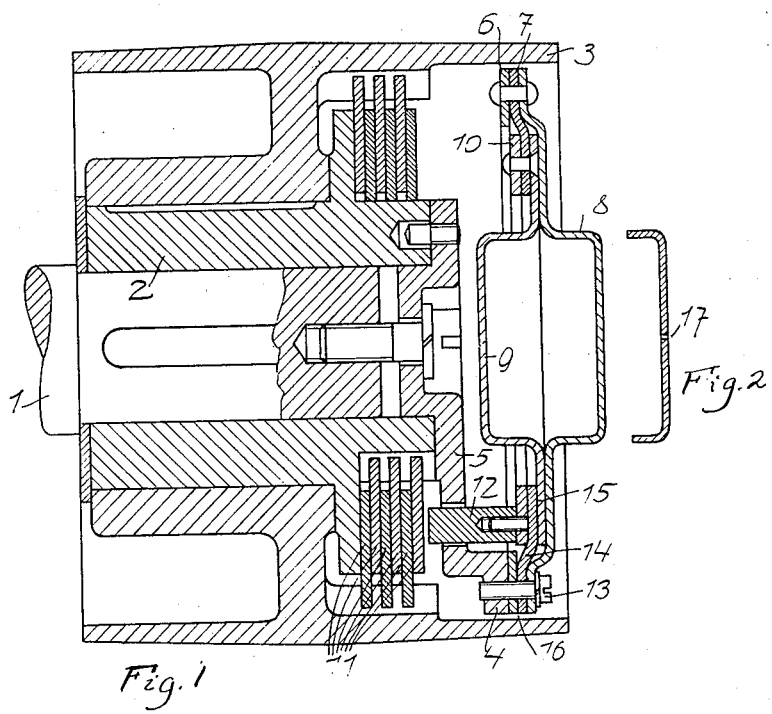

May 3, 1932.  F. GÖTZ  1,857,016

CENTRIFUGAL FORCE FLUID PRESSURE CLUTCH

Filed Oct. 4, 1930

Inventor:
Frantisek Gotz
by C. F. Wenderoth
Atty.

Patented May 3, 1932

1,857,016

UNITED STATES PATENT OFFICE

FRANTIŠEK GÖTZ, OF PILSEN, CZECHOSLOVAKIA

CENTRIFUGAL FORCE FLUID PRESSURE CLUTCH

Application filed October 4, 1930, Serial No. 486,482, and in Czechoslovakia February 24, 1930.

The present invention relates to a centrifugal force fluid pressure clutch the essential feature of which lies in the constructional execution of the pressure chamber. An example of the practical construction is shown in Figs. 1 and 2 of the accompanying drawings.

Fig. 1 shows a clutch which is constructed as a starter for motors which are intended to be started not under load. On the driving shaft 1 is keyed the tappet or drive 2 for the plates on which the belt pulley (gear wheel) 3 is loosely mounted. This drive 2 is also rigidly connected to the drive of the pressure chamber 5, which is provided with the arm 4. The pressure chamber forms an independent member and consists of the ring 6, the diaphragm 7, the cover 8, the axially or endway movable plate 9 and the inner ring 10. In order to keep the amount of space required as small as possible and at the same time to secure a sufficient force or pressure for the liquid the pressure chamber is mounted loosely on the end of the shaft in such a way that the shaft does not pass through the chamber. This pressure chamber so constructed is partially filled with a liquid (such as mercury, glycerine or the like,) which when the clutch is at rest lies in the lower part of the pressure chamber, whereas on the other hand, during the rotation of the clutch, it exerts at the periphery on the axially or endway movable plate 9 the pressure necessary for throwing the clutch into operation. This pressure is transmitted to the plates 11 by means of the adjustable pins 12, which pass through openings or recesses in the drive 5 of the pressure chamber. The independent and liquid-containing pressure chamber is rigidly held to the arms 4 of the drive 5 of the pressure chamber by means of the screws 13.

The clutch mounted in the interior of a belt pulley (or of a gear wheel) as shown in Fig. 1 requires generally extremely small dimensions so as to keep the diameter of the belt pulley (the pinion) as small as possible. In order therefore in this case to secure as great a pressure of the liquid as possible and to prevent any appreciable rarefaction of the air in the closed pressure chamber when the clutch is thrown into operation, the pressure chamber may advantageously be constructed as shown in Fig. 1. The surface of the cover of the pressure chamber and of the axially or endway movable plate 9 which during the rotation of the clutch form the constricted space filled by the rotation ring of liquid, seat themselves upon each other when the clutch is not thrown into operation, while the space of the pressure chamber enlarges towards the middle in the form of a storage container. In order to secure a large amount of transmitted power, mercury may be used with advantage, as owing to its high specific gravity it produces a great pressure during the rotation. In view of the high price of mercury it is desirable to reduce the amount required as far as possible and this requirement is likewise fulfilled in the form of the pressure chamber shown in Fig. 1.

In order that the surfaces of the cover 8 of the pressure chamber and of the axially movable plate 9, which when the clutch rotates form the space filled by the rotating ring of liquid, may seat themselves on each other, the axially movable plate 9 may be pressed against the plate 8, as shown in Fig. 1, by means of a rubber diaphragm offset at points 14. Owing to the offsetting the rubber diaphragms tends to thrust the plate 9 axially in one or other direction. Owing to the fact that the contact surface between the rubber diaphragm 7 and the plate 9 on the inner periphery at the points 15 is axially displaced in the direction of the friction surfaces with regard to the plane in which lies the contact surface between the rubber diaphragm 7 and the cover 8 at the outer periphery at the points 16, the upset rubber diaphragm presses upon the plate 9 in such a way that it remains seated upon the cover 8 until the rotating liquid overcomes this pressure.

The pressure chamber is also constructed in the following way. The pressure chamber formed by the cover 8 and the axially movable plate 9 contains also air, in addition to a certain quantity of liquid. When the clutch starts, as soon as the liquid owing to its centrifugal force causes the axially movable plate 9 to be moved endways, rarefaction of the air in the closed chamber takes place, which can be kept within certain limits by selection of the size of the storage vessel. This rarefaction, that is to say the excess pressure of the atmospheric air, is desirable in the closed chamber up to a certain degree, as it acts like a spring in the direction of the release of the clutch. At lower revolutions or in the case of great displacement of the plate 9, the excess pressure of the atmospheric air would however attain a considerable value compared with the pressure of the rotating liquid and appreciably reduce the power transmitted. For this reason the pressure chamber is in this case provided with a ventilating opening 17 as shown in Fig. 2.

It is evident that the invention is susceptible to numerous modifications and adaptations without departing from the spirit thereof, and it is intended that it be limited only by the scope of the appended claims.

I claim:—

1. A friction clutch employing the centrifugal force of a liquid for the pressure for the transmission of power, comprising a driving shaft, a driven member, a pressure chamber containing liquid and mounted on the shaft for rotation therewith in such manner that the shaft does not pass therethrough, the said pressure chamber comprising a cover member and an axially movable plate movable relative to the said cover, the said cover and plate, when the clutch is not in action, being seated on each other along the portion of the chamber in which the rotating liquid is found during rotation of the clutch, and means for transmitting the driving force of said plate to said driven member.

2. A friction clutch employing the centrifugal force of a liquid for the pressure for the transmission of power, comprising a driving shaft, a driven member, a pressure chamber containing liquid and mounted on the shaft for rotation therewith in such manner that the shaft does not pass therethrough, the said pressure chamber comprising a cover member and an axially movable plate movable relative to the said cover, the said cover and plate, when the clutch is not in action, being seated on each other along the portion of the chamber in which the rotating liquid is found during rotation of the clutch, means for pressing the said cover and plate together along an axial line when the clutch is not in action, and means for transmitting the driving force of said plate to said driven member.

3. A friction clutch employing the centrifugal force of a liquid for the pressure for the transmission of power, comprising a driving shaft, a driven member, a pressure chamber containing liquid and mounted on the shaft for rotation therewith in such manner that the shaft does not pass therethrough, the said pressure chamber comprising a cover member and an axially movable plate movable relative to the said cover, the said cover and plate, when the clutch is not in action, being seated on each other along the portion of the chamber in which the rotating liquid is found during rotation of the clutch, means for pressing the said cover and plate together along an axial line when the clutch is not in action, the said last mentioned means comprising an offset elastic diaphragm mounted adjacent the peripheries of the said cover and plate, and means for transmitting the driving force of said plate to said driven member.

4. A friction clutch employing the centrifugal force of a liquid for the pressure for the transmission of power, comprising a driving member, a driven member, friction plates mounted between the said driving member and the said driven member, and a pressure chamber mounted on the said driving member for rotation therewith and housing the said liquid, the said pressure chamber being in the nature of a diaphragm so that when the driving shaft is rotated the centrifugal force of the liquid causes the pressure chamber to force the pressure plates into operable relation with respect to each other, and ventilating means in the said clutch for equalizing the air pressure in the said chamber during rotation thereof, but which prevents the escape of the liquid contents of the chamber.

In testimony whereof I affix my signature.

FRANTIŠEK GÖTZ.